United States Patent [19]
Häring et al.

[11] Patent Number: 6,048,088
[45] Date of Patent: Apr. 11, 2000

[54] MULTI-SHAFT SCREW-TYPE EXTRUDER, IN PARTICULAR TWIN-SHAFT EXTRUDER

[75] Inventors: Erwin Häring, Stuttgart-Botnung; Gerhard Weihrich, Illingen; Ulrich Burkhardt, Stuttgart, all of Germany

[73] Assignee: Krupp Werner & Pfleiderer GmbH, Germany

[21] Appl. No.: 09/067,170

[22] Filed: Apr. 27, 1998

[30] Foreign Application Priority Data

Apr. 30, 1997 [DE] Germany .............. 197 18 292

[51] Int. Cl.⁷ ........................................... B29B 7/20
[52] U.S. Cl. ................................. 366/85; 366/97
[58] Field of Search ............... 366/81, 82, 85, 366/84, 83, 96, 97, 300, 301, 297, 298, 299

[56] References Cited

U.S. PATENT DOCUMENTS

| | | | |
|---|---|---|---|
| 3,729,178 | 4/1973 | Stade | 366/84 |
| 4,875,847 | 10/1989 | Wenger et al. | 366/83 |
| 5,048,971 | 9/1991 | Wall et al. | 366/85 |
| 5,215,373 | 6/1993 | Grisard | 366/85 |

FOREIGN PATENT DOCUMENTS

2550969C2 12/1982 Germany .
4122912A1 1/1993 Germany .

*Primary Examiner*—Tony G. Soohoo
*Attorney, Agent, or Firm*—Robert F. I. Conte; Lee, Mann, Smith, McWilliams, Sweeney & Ohlson

[57] ABSTRACT

A multi-shaft screw-type extruder having a casing with two parallel intersecting casing bores and two shafts drivably disposed in the casing bores. Screw elements intermeshing kneading disks are fixed on the shafts The widths of the respective crest portions of the kneading disks are smaller than the disk width and form mixing-and-scraping-studs on the periphery of the disks. The mixing-and-scraping-studs on each kneading disk are axially misaligned relative to each other such that their peripheral faying surfaces jointly cover the entire disk width.

12 Claims, 5 Drawing Sheets

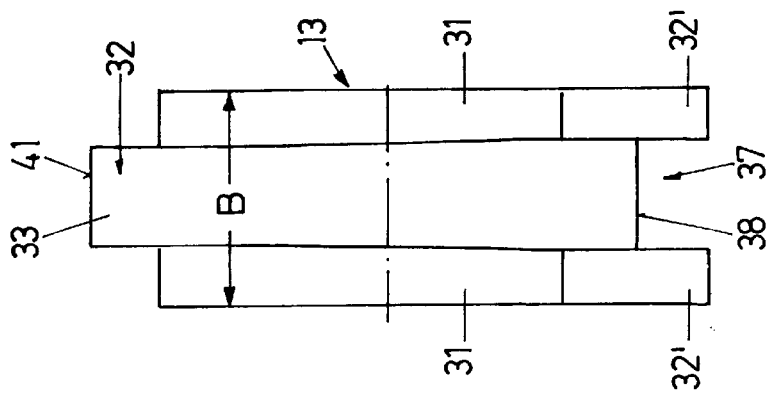
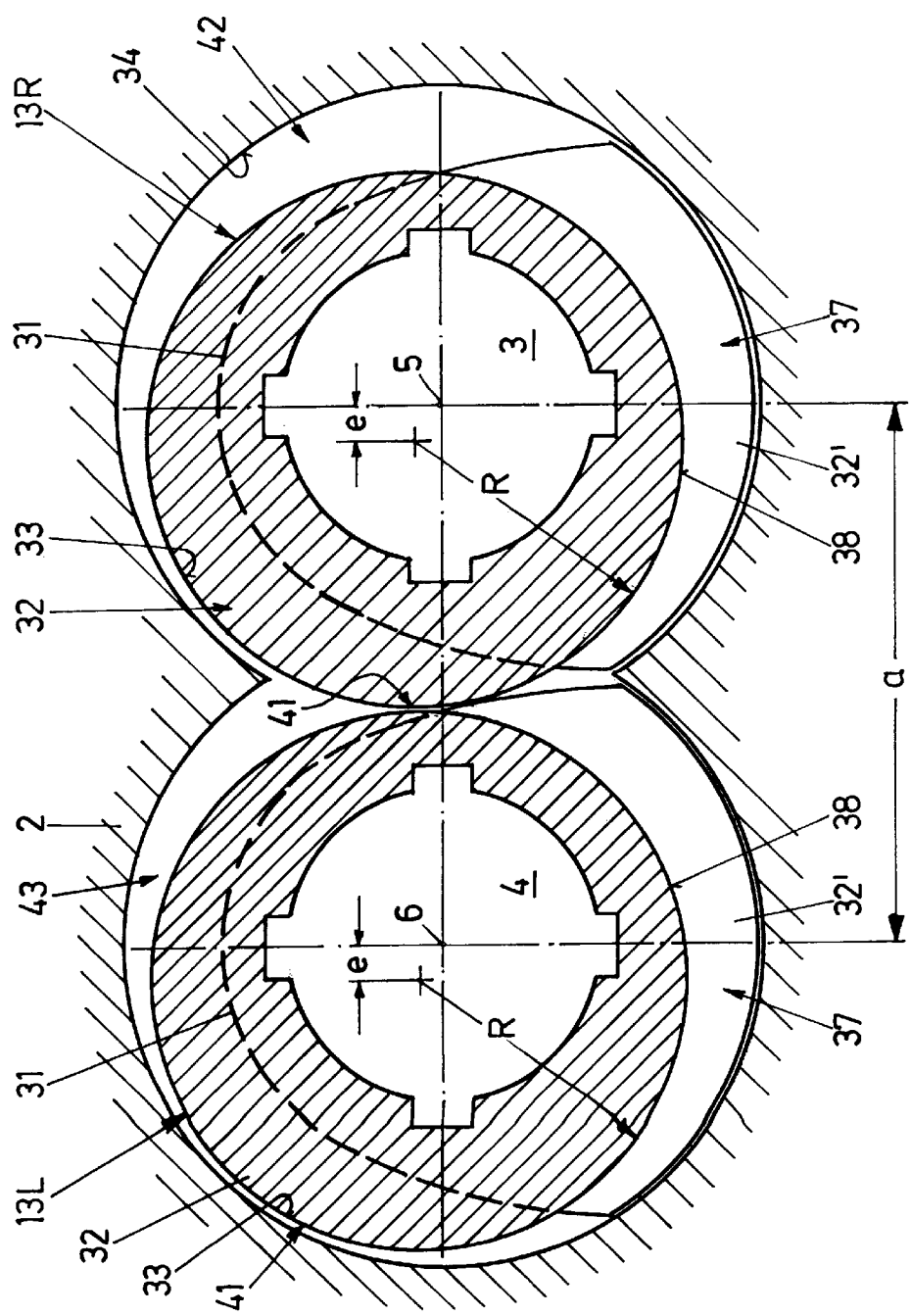

6,048,088

MULTI-SHAFT SCREW-TYPE EXTRUDER, IN PARTICULAR TWIN-SHAFT EXTRUDER

BACKGROUND OF THE INVENTION

1. Field of the Invention

The invention relates to a multi-shaft screw-type extruder and in particular to a twin-shaft extruder.

2. Background Art

A screw-type extruder according to the prior art is known from DE 25 50 969 C2. It is provided with kneading disks which are non-rotatably mounted on the two screw shafts, providing for a processing of the material conveyed through the extruder, for instance homogenizing, mixing, kneading, plasticizing and the like. Depending on the number of their flights, the kneading disks may have a lenticular (two-flight kneading disk), trochoidal (three-flight kneading disk) etc. contour.

The mentioned prior art patent shows three-flight kneading disks, the crest portions of which are reduced as compared to the basic width of the kneading disk for mixing-and-scraping-studs to form on the periphery.

In addition to the mixing function as a result of the intermeshing action of the kneading disks which are disposed side by side in a joint axial position, these studs serve for scraping the material to be processed off the inside wall of the casing. To this end, the faying surfaces of the studs which extend radially outwards and are disposed by defined play towards the inside wall of the casing, slide over the inside wall of the casing, taking along the accumulated material.

A drawback of the known construction resides in that the casing wall is scraped only where the crest portion of the mixing-and-scraping-studs is fully developed, scraping not taking place in the area between these studs. This faulty scraping effect leads to considerable deterioration of the heat transfer from and to the casing wall, because the processed product is not exchanged in the areas that are not scraped. Furthermore, heat transfer by convection does not take place, owing to the bad thermal conductivity conditioned by the product. Also, these problems entail the risk that the material which has not be scraped off will scorch on the inside wall of the casing, which will result in the product being damaged by reason of the ensuing prolonged dwell times of the product in these areas. Furthermore, the technological properties of the screw-type extruder are negatively affected by the casing cross-section becoming gradually clogged.

DE 41 22 912 A1 teaches a twin-screw extruder in which the faying surfaces of the kneading disks which extend in the peripheral direction are provided with edges which are transverse to the axial direction of the screws and which at least partially slope relative to the axis of the screws. The damming effect of the kneading disks is maintained by this sloping, but their free cross-sectional passage area is enlarged to such an extent that shear peaks that might be thermally harmful to the product to be processed are clearly reduced. However, the embodiment illustrated by DE 41 22 912 A1 does not ensure either that the full surface of the inside wall of the casing is scraped.

SUMMARY OF THE INVENTION

It is the object of the invention to specify an arrangement of the mixing-and-scraping-studs in which scraping of the entire surface of the inside wall of the casing is attained, accompanied with the maintenance of the advantages in terms of processing technology of these studs of reduced width.

According to the invention, this object is attained in a screw-type extruder comprising a casing; several, preferably two, parallel and partially intersecting casing bores; several, preferably two, shafts disposed in the casing bores to rotate in the same or counter direction and preferably drivable to rotate in the same direction; screw elements fixed on the shafts; and intermeshing kneading disks, which are fixed on the shafts and the respective crest portions of which are reduced in relation to the disk width for mixing-and-scraping-studs to form, which are located on the periphery; wherein the mixing-and-scraping-studs on each kneading disk are misaligned in the axial direction such that peripheral faying surfaces jointly cover the entire disk width. Thus, the material resting on the casing wall is removed in a single operation upon a full rotation of the kneading disk over its width at each axial position. The prior art drawbacks mentioned at the outset are efficiently avoided. Thus, an excellent mixing effect of these kneading disks is accompanied with complete scraping of the casing wall.

Further features, details and advantages of the invention will become apparent from the ensuing description of preferred embodiments, taken in conjunction with the drawing.

BRIEF DESCRIPTION OF THE DRAWING

FIGS. 9 and 10 are sections, analogous to FIG. 1, of a screw-type extruder with kneading disks in two further embodiments; and FIG. 11 is a plan view of one of the kneading disks of FIG. 10.

DESCRIPTION OF THE PREFERRED EMBODIMENTS

Figure 1:
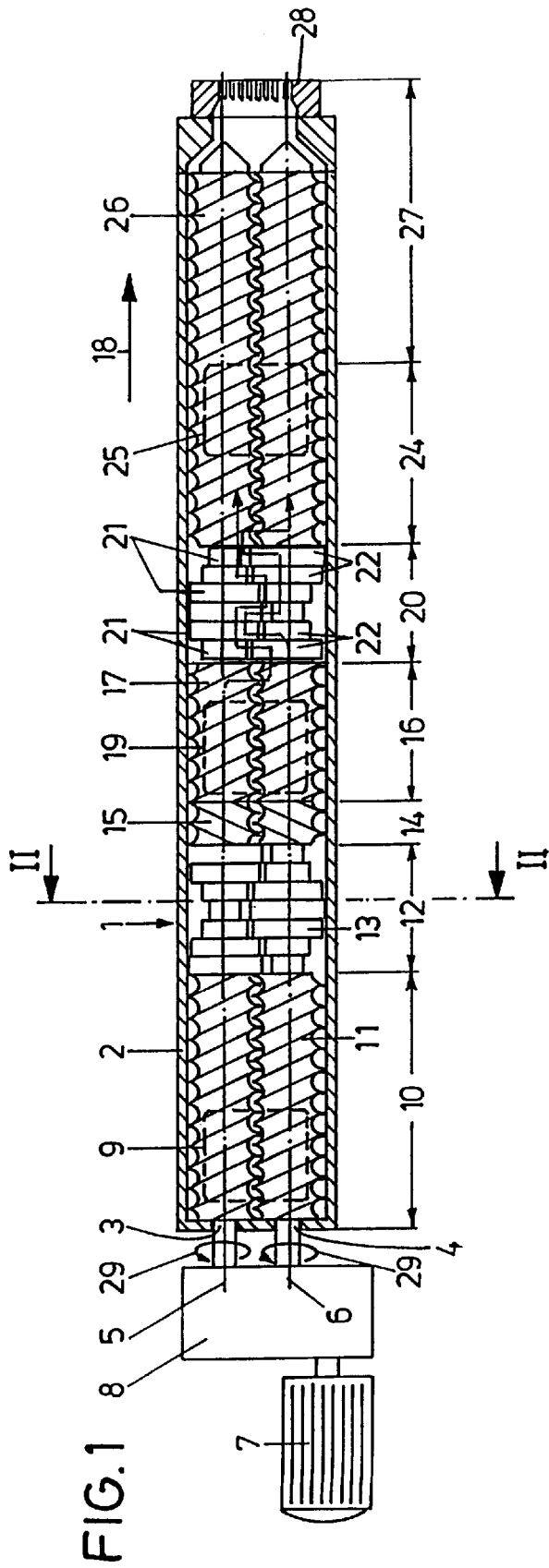
FIG. 1 is a plan view of a twin-shaft extruder with a casing in an illustration partially broken open.

FIG. 1 illustrates a twin-shaft extruder 1 with its casing 2 in an illustration broken open. The twin-shaft extruder 1 comprises two shafts 3, 4, the axes 5, 6 of which are parallel. A motor 7 drives the shafts 3, 4 in the same direction of rotation 29 by way of a branching gearing 8. Adjoining the gearing 8, a charging hopper 9 (roughly outlined) is provided in the casing 2 for a polymer to be melted in the extruder 1. Subsequent to and below this hopper 9, a feed zone 10 is formed, in which conveying screw elements 11 are disposed on the shafts 3, 4. Subsequent to this, kneading disks 13 are non-rotatably mounted on the shafts 3, 4 in a melting zone 12. This is followed by an accumulation zone 14, in which the shafts 3, 4 are provided with return conveying screw elements 15, the threads of which having a direction reverse to that of the conveying screw elements 11. The accumulation zone 14 is followed by an adding zone 16, in which again conveying screw elements 17 are mounted on the shafts 3, 4, feeding in the conveying direction 18 of the extruder 1. Directly behind the return conveying screw elements 15, an adding hopper 19 (roughly outlined) opens into the casing 2. It serves for the addition of additives such as fillers or glass fibers into the melt.

The melting zone 16 is followed by a mixing zone 20, in which the shafts 3, 4 are provided with mixing and shearing elements 21, 22. These are preferably kneading disks 13 according to the invention, details of which will be explained in the following. This mixing zone 20 is followed by a vented zone 24, in which a vent 25 (roughly outlined) is formed in the casing 2. In this vented zone 24 conveying screw elements 26 are mounted on the shafts 3, 4, conveying the polymer, to which fillers and reinforcing agents have been added, in the conveying direction 18 towards a discharge zone 27 with a so-called apertured strip as a discharge member 28.

As regards the positioning of the kneading disks 13 and the mixing and shearing elements 21, 22 according to the invention, they are preferably used where a gentle mixing and shearing effect is required for the process in the screw-type extruder. These are for instance zones where the product itself must be transferred into a homogeneous form in terms of molecular-weight distribution, melt index or temperature. Depending on the requirements, the mixing and shearing elements (21, 22, kneading disks 13) can be employed virtually at any place in the screw-type extruder, it being possible to select embodiments of the element that correspond to the conditions in the process and the properties of the product.

Figure 2:
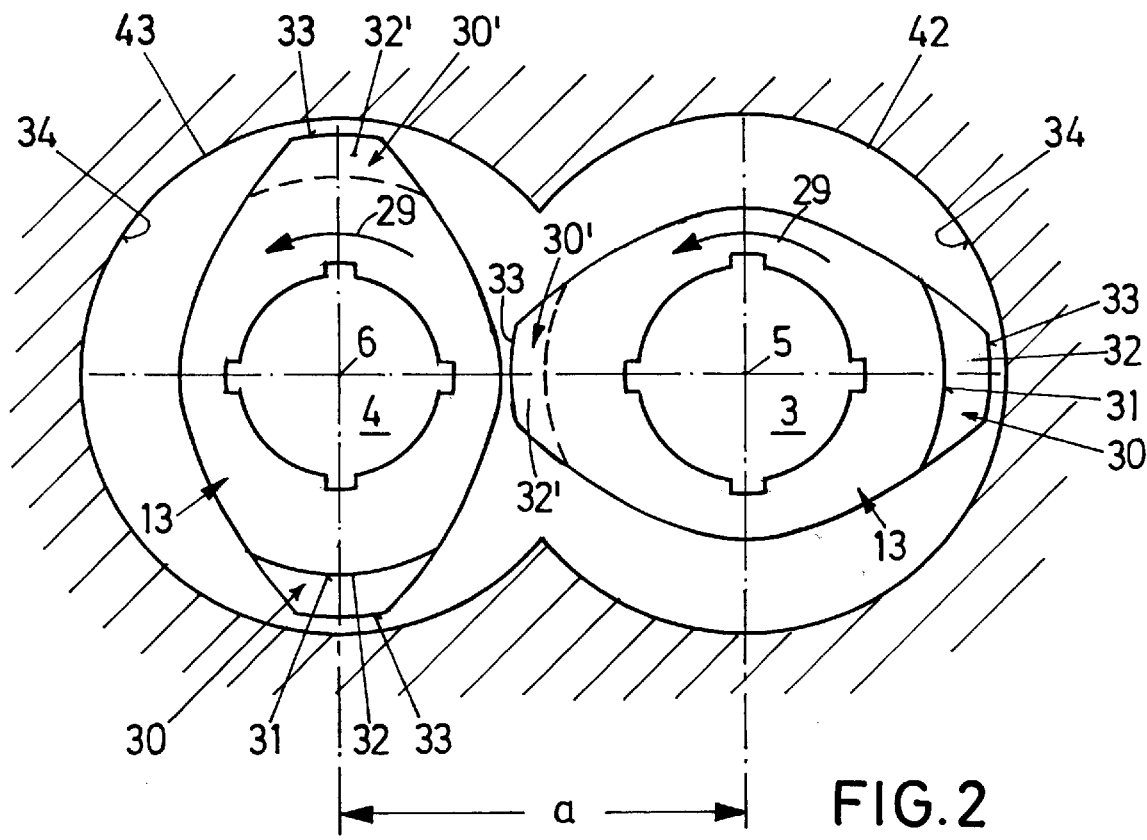
FIG. 2 is a diagrammatic section through the extruder on the section line II—II of FIG. 1.
Figure 3:
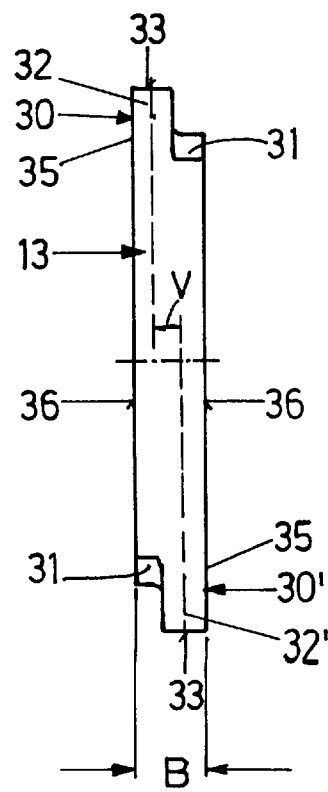
FIG. 3 is a plan view of a kneading disk in a first embodiment.

The design of the kneading disks 13 is explained, based on FIGS. 2 and 3. They are placed in pairs side by side in a fixed axial position on the shafts 3,4, the successive kneading disks 13 on a shaft 3 and 4, respectively, being displaced relative to each other, from one pair to the next, by a defined angle of for instance 30°, 45° or 60°. Since this is customary in extruders, FIG. 2 illustrates only one pair of kneading disks 13. The kneading disks are mounted (fixed) on the shaft such that they rotate with the shaft.

These kneading disks 13 are two-flight kneading disks, in an axial view having a substantially lenticular contour. As compared to the width B of the disk, the radially outward crest portions 30, 30' are reduced by shoulders 31 that stand back radially. Mixing-and-scraping-studs 32, 32' are formed in this way, and these studs 32,32' are located on the periphery. These studs 32, 32' are axially misaligned on each kneading disk in such a way that their peripheral faying surfaces 33 jointly cover the entire width B of the disks. This provides for the extruder-processed material to be scraped off the casing inside wall 34, which is formed by the casing bores 42, 43, over the full surface in the vicinity of the melting zone 12 per complete rotation of the shaft 3 and 4.

As seen in FIG. 3, the two opposed studs 32, 32' are displaced by a misalignment V to such an extent that the fronts 35, turned away from each other, of the studs 32, 32' are flush with the respective fronts 36 of the kneading disk 13. Moreover, the effect of complete scraping of the casing inside wall 34 is attained in particular when the total width of the disk shoulders 31 in a crest portion (30) amounts to half the disk width B maximally.

Figure 4:
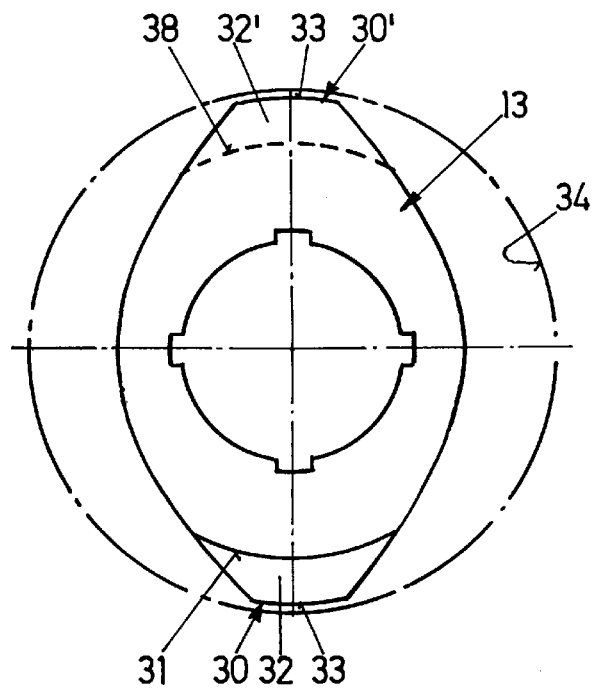
FIG. 4 is a lateral view in the axial direction of a kneading disk in a second embodiment.
Figure 5:
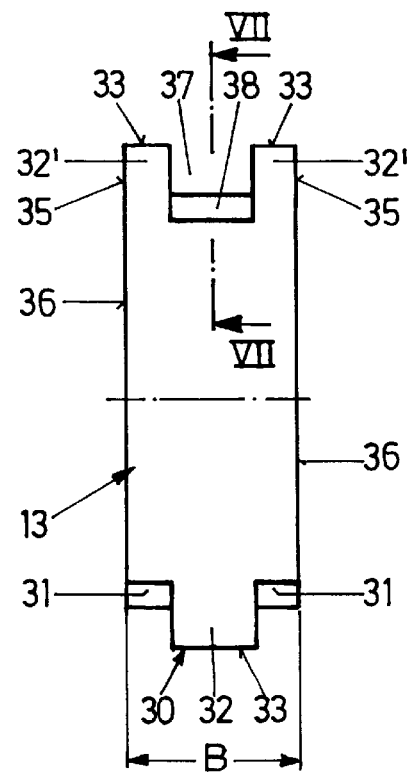
FIG. 5 is a plan view of the kneading disk of FIG. 4.

In the embodiment of a kneading disk 13 seen in FIGS. 4 and 5, a mixing-and-scraping-stud 32 is formed in a crest portion 30 (bottom of FIGS. 4 and 5), which, in relation to the disk width B, is narrowed on both sides by shoulders 31. Two studs 32' are disposed by displacement thereto in the second crest portion 30 (top of FIGS. 4 and 5), their fronts 35 again lying in a plane with the fronts 36 of the kneading disk 13. The two studs 32' form a shear clearance 37 between them, which overlaps the opposite mixing-and-scraping-stud 32, referred to the axial direction. The faying surfaces 33 of the three studs 32, 32' again jointly cover the entire disk width B so that the material is completely scraped off the casing inside wall.

The embodiment, seen in FIGS. 4 and 5, of the kneading disks 13 advantageously serves to attain a shearing and mixing effect on the material to be processed, this being accompanied with simultaneous scraping of the casing wall.

Figure 6:
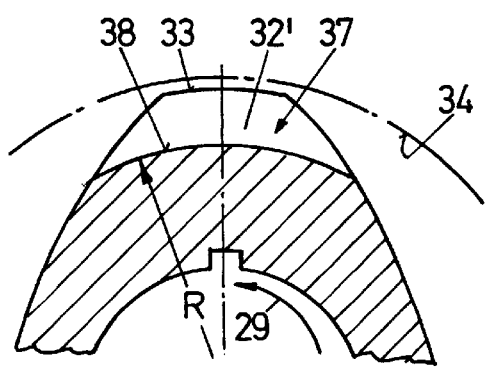
FIGS. 6 to 8 are partial sections of the kneading disk on the section line VII—VII of FIG. 5 with differing embodiments of the bottom of the clearance.
Figure 7:
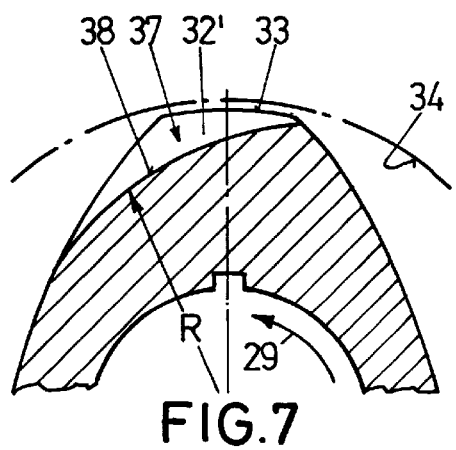
Figure 8:
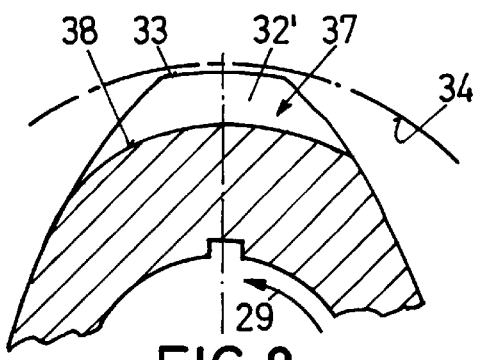

Depending on the requirements in terms of process technology, the shear clearance 37 may be embodied differently as seen in FIGS. 6 to 8. In the embodiment seen in FIG. 6, the contour of the bottom 38 of the clearance is formed as an arc of a circle concentric to the axis 5 of the shaft 3 and having the radius R. This results in a depth, uniform in the peripheral direction, of the shear clearance 37. As with all the other embodiments of the kneading disks, the basic profile of the kneading disk may also be disposed eccentrically to the shaft axis, which is the case in the ensuing illustrations.

In the embodiment seen in FIG. 7, the bottom 38 of the shear clearance possesses a contour which ascends counter to the direction of rotation 29 of the shaft 3 and which forms an arc of a circle eccentric relative to the shaft axis 5 and having the radius R'.

In FIG. 8, the bottom 38 of the clearance is provided with a contour deviating from that of an arc of a circle.

Figure 9:
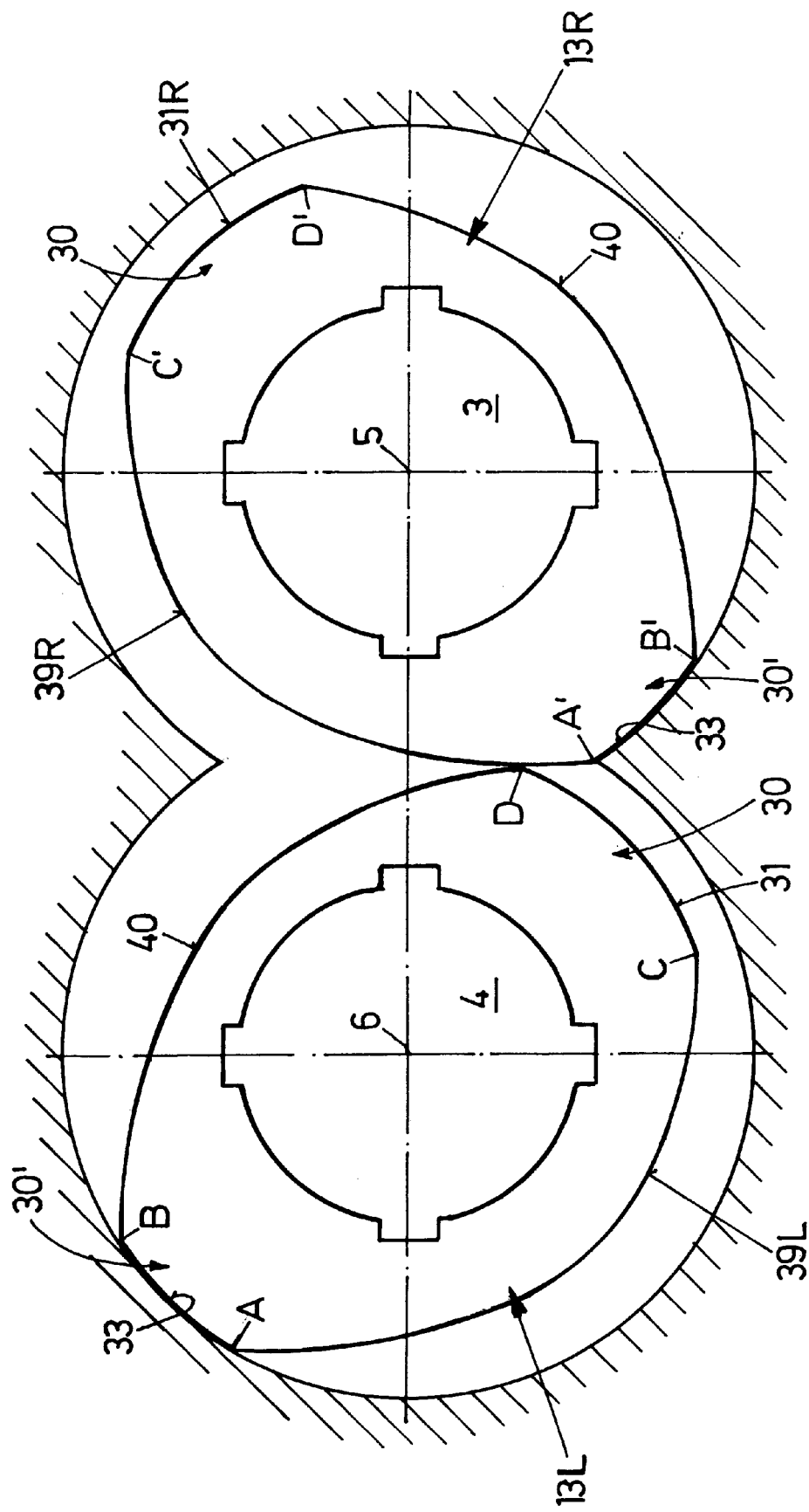

FIG. 9 illustrates another alternative embodiment of the kneading disks 13, in which the bottom of the clearance is embodied according to the laws known per se for a so-called self-cleaning faying profile for a multi-shaft screw-type extruder with screw shafts rotating in the same direction. To this end, a radially reduced shoulder 31 in the crest portion 30 of the left kneading disk 13L (length CD) is associated with a counter-convexity 39R on the right kneading disk 13R (length C'A'). The peripheral surface of the counter-convexity 39R slides over the peripheral surface of the shoulder 31, having the customary play, so that mutual scraping of the kneading disks 13 and thus self-cleaning take place. In like manner, the left kneading disk 13L possesses a counter-convexity 39L (length AC) which cooperates in the way specified with the reduced shoulder 31R of the crest portion 30 of the right kneading disk 13R.

The flanks 40 (lengths BD and B'D', respectively) opposite the counter-convexities 39 have a contour which stands out less far in the radial direction and which cooperates with the faying surface 33 (length AB and A'B', respectively) of the alternately opposite kneading disk 13.

In the kneading disk combination seen in FIG. 9, self-cleaning of the profile is attained in addition to the scraping of the casing wall by a correction of the contour.

The same effect may be obtained in a different way by the contour seen in FIGS. 10 and 11 of kneading disks 13. Again, provision is made for a design with mixing-and-scraping-studs 32 and an opposite shear clearance 37. The faying surface 33 of the stud 32 and the bottom 38 of the shear clearance 37 are jointly produced by a circular contour, which is illustrated by the hatched circular areas in FIG. 10. The diameter 2R of this circular contour corresponds to the distance a of the two axes 5, 6 of the extruder 1. Their eccentricity e is designed such that the vertex 41 of the faying surface 33 scrapes the casing inside wall 34. The shear clearance 37 is defined by two studs 32' that exhibit a contour in the shape of an arc of a circle. This arc of a circle is adjoined in each case by an approximately parabolic contour which forms the shoulders 31 on both sides of the mixing-and-scraping-stud 32, the shoulders 31 having a non-circular shape. Self-cleaning of the profile is attained by the alternating engagement of the stud 32 of one kneading disk 13L with the shear clearance 37 of the other kneading disk 13R. The misalignment of the studs 32 and 32' again serves to achieve that the casing inside wall 34 is scraped over the complete width B of the disk upon one full rotation of the kneading disks 13.

Attention is drawn to the fact that the above exemplary embodiments illustrate single-flight kneading disks. By multiplication of the corresponding kneading disk contours, the kneading disks can also be embodied as being multi-flight disks.

Further, several kneading disks of varying design as shown above and of changing angles of misalignment can be combined in a mixing zone.

What is claimed is:

1. A multi-shaft screw-type extruder, comprising a casing (2);

at least two parallel and partially intersecting casing bores (42, 43);

at least two shafts (3, 4) disposed in the casing bores (42, 43) and drivable to rotate in one of the same and the counter direction;

screw elements (11, 17, 23, 26) fixed on the shafts (3, 4);

intermeshing kneading disks (13), which are fixed on the shafts (3, 4), said disks having a disk width (B) and crest portions (30, 30') located in a periphery of the kneading disks (13); and mixing-and-scraping-studs (32, 32') formed by the respective crest portions (30, 30'), said studs (32,32') have a smaller width than said disk width (B), and said studs having peripheral faying surfaces (33), wherein the mixing-and-scraping-studs (32, 32') on each kneading disk (13) are misaligned in an axial direction such that the peripheral faying surfaces (33) of the mixing-and-scraping-studs (32) jointly cover the entire disk width (B) of each kneading disk (13).

2. A screw-type extruder according to claim 1, wherein each kneading disk (13) comprises disk fronts (36) and the mixing-and-scraping-studs (32, 32') of each kneading disk (13) comprise stud fronts (35), the mixing-and-scraping-studs (32, 32') of the same disks (13) being misaligned relative to each other in the axial direction such that said stud fronts (35), turned away from each other, are flush with said respective disk fronts (36).

3. A screw-type extruder according to claim 1, wherein mixing-and-scraping-studs (32'), which are disposed on a kneading disk (13) in a first crest portion (30') and which are misaligned outwards in the axial direction and which, between themselves, form a shear clearance (37), are combined with a mixing-and-scraping-stud (32), which is disposed in a second crest portion (30) and which overlaps the shear clearance (37).

4. A screw-type extruder according to claim 3, wherein a bottom (38) of the shear clearance (37) has a contour which ascends counter to a direction of rotation (29) of the shaft (3, 4).

5. A screw-type extruder according to claim 4, wherein each kneading disk (13) comprises a counter-convexity (39) on the disk flanks situated between two mixing-and-scraping-studs (32, 32'), wherein each kneading disk (13) comprises kneading disk shoulders (31) flanking the mixing-and-scraping-studs (32), wherein at least one of the disk shoulders (31) and of the bottom (38) of the shear clearance (37) of the kneading disk (13) have a reduced contour and wherein the counter-convexity (39) of one kneading disk (13) corresponds to the reduced contour of an opposite intermeshing disk (13).

6. A screw-type extruder according to claim 3, wherein an external contour of the mixing-and-scraping-stud (32) and a contour of a bottom (38) of the shear clearance (37), opposite the mixing-and-scraping-stud (32), of a kneading disk (13) is formed by an eccentric circular contour which is continuous in a peripheral direction and a diameter of which is equal to an axial distance (a) of the two shafts (3, 4) and an eccentricity (e) of which is such that the mixing-and-scraping-studs (32) touch a casing wall (34) upon shaft rotation.

7. A screw-type extruder according to claim 1, wherein the kneading disk (13) comprises kneading disk shoulders (31) flanking the mixing-and-scraping-studs (32), said kneading disk shoulders (31) having a non-circular contour.

8. A screw-type extruder according to claim 1, wherein the kneading disks (13) comprise kneading disk shoulders (31) flanking the mixing-and-scraping-stud (32) and wherein a total width of the disk shoulders (31) amounts to half the disk width (B) maximally.

9. A screw-type extruder according to claim 1, wherein a basic contour of the kneading disk is a multi-flight contour.

10. A screw-type extruder according to claim 1, wherein a basic contour of the kneading disks (13) is disposed eccentrically to a shaft axis.

11. A screw-type extruder according to claim 1, wherein several kneading disks (13) of varying embodiments and angles of misalignment are combined in a mixing zone.

12. A screw-type extruder according to claim 1, wherein the kneading disks (13) on the same shaft (3, 4) are misaligned relative to each other in the same direction of rotation.

* * * * *